(12) United States Patent
Van Erp

(10) Patent No.: US 12,281,945 B2
(45) Date of Patent: Apr. 22, 2025

(54) TEMPERATURE MEASUREMENT

(71) Applicant: GEA FOOD SOLUTIONS BAKEL B.V., Bakel (NL)

(72) Inventor: Joost Van Erp, Nuenen (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 624 days.

(21) Appl. No.: 17/605,328

(22) PCT Filed: Apr. 28, 2020

(86) PCT No.: PCT/EP2020/061755
§ 371 (c)(1),
(2) Date: Oct. 21, 2021

(87) PCT Pub. No.: WO2020/221743
PCT Pub. Date: Nov. 5, 2020

(65) Prior Publication Data
US 2022/0205850 A1 Jun. 30, 2022

(30) Foreign Application Priority Data
Apr. 30, 2019 (EP) .................................... 19171892

(51) Int. Cl.
*G01K 11/00* (2006.01)
*G01K 13/04* (2006.01)
*G01K 15/00* (2006.01)

(52) U.S. Cl.
CPC ............ *G01K 11/006* (2013.01); *G01K 13/04* (2013.01); *G01K 15/005* (2013.01); *G01K 2207/06* (2013.01)

(58) Field of Classification Search
CPC ... G01K 11/006; G01K 2207/06; G01K 13/04
See application file for complete search history.

(56) References Cited

U.S. PATENT DOCUMENTS

| 3,851,355 | A | | 12/1974 | Hughes | |
|---|---|---|---|---|---|
| 5,986,249 | A | * | 11/1999 | Yoshino | ................. H05B 6/688 219/754 |

(Continued)

FOREIGN PATENT DOCUMENTS

| EP | 3327355 A1 | 5/2018 |
|---|---|---|
| WO | 00/30458 A1 | 6/2000 |

(Continued)

OTHER PUBLICATIONS

International Search Report and Written Opinion dated Jun. 30, 2020, for International Application No. PCT/EP2020/061755.

(Continued)

*Primary Examiner* — Mirellys Jagan
(74) *Attorney, Agent, or Firm* — The Dobrusin Law Firm, P.C.

(57) ABSTRACT

A method to determine a temperature of a product, the method includes: determining a dielectric constant as a function of a core-, surface-, and/or average-temperature correlation ε(T) of at least one product and storing the dielectric constant in a computer means; locating the product between a microwave-radiometry-antenna and a microwave-radiometry-receiver and measuring the dielectric properties of the product; selecting the correlation ε(T) that corresponds to the product whose dielectric properties have been measured, and calculating the core-, surface-, and/or average-temperature of the product using the dielectric constant correlation ε(T).

6 Claims, 3 Drawing Sheets

(56) References Cited

U.S. PATENT DOCUMENTS

| | | | |
|---|---|---|---|
| 2004/0022298 A1* | 2/2004 | Gunawardena | ........ G01K 13/06 |
| | | | 374/E13.009 |
| 2006/0153271 A1 | 7/2006 | Hill et al. | |
| 2012/0261406 A1 | 10/2012 | Van Rens | |

FOREIGN PATENT DOCUMENTS

| | | | | |
|---|---|---|---|---|
| WO | 2004/002229 A2 | 1/2004 | | |
| WO | 2010/110655 A1 | 9/2010 | | |
| WO | 2011/005099 A1 | 1/2011 | | |
| WO | 2012/012581 A1 | 1/2012 | | |
| WO | WO-2012034029 A1 * | 3/2012 | ............ | B65G 43/00 |
| WO | 2013/014010 A1 | 1/2013 | | |
| WO | 2014/177715 A1 | 11/2014 | | |
| WO | 2015/082254 A1 | 6/2015 | | |
| WO | 2015/169812 A1 | 11/2015 | | |
| WO | WO-2017122006 A1 * | 7/2017 | ............ | B65G 47/71 |

OTHER PUBLICATIONS

International Preliminary Report on Patentability dated Jul. 27, 2021, for International Application No. PCT/EP2020/061755.
Free-Space Measurement of Complex Permittivity and Complex Permeability of Magnetic Materials at Microwave Frequencies, D.K. Ghodgankar et al, IEE Transactions on Instrumentation and Measurement; vol. 39, No. 2, Apr. 1990, p. 387.
Notice of Opposition dated Oct. 22, 2021, for European Patent Application 18717388.5.

* cited by examiner

TEMPERATURE MEASUREMENT

PRIORITY

This application is a US National Stage entry of PCT/EP2020/061755 filed on Apr. 28, 2020, which claims priority to EP 19171892.3 filed on Apr. 30, 2019, all of which are expressly incorporated by reference herein for all purposes.

FIELD

This application relates to a method to determine the average temperature of a product and to a method to heat a product.

BACKGROUND

Food products, especially protein containing food products, such as meat, fish or the like, are often heat treated, for example cooked or fried. In industrial applications, this heat treatment takes place in a heat-treatment device, for example an oven, which comprises a transportation means, for example a belt, preferably an endless belt, which moves the products through the heat treatment device, where they are subjected to heat. In many cases, several products are transported side by side, in parallel rows, or in an arbitrary arrangement, through the heat treatment device. Since the temperature-distribution over the width of the oven, the products and/or the heat-transfer in the oven are not uniform, the pasteurization of the individual product is also not uniform, which is, however, often undesired. It is especially undesired to have products with a too low core temperature and/or overcooked products. In order to overcome this problem, there are heat treatment devices with product temperature measurements known from the state in the art. However, these temperature readings are too inaccurate to precisely control the heating conditions in the heat treatment device.

SUMMARY

It is therefore the objective of the present invention to provide a method to determine the average temperature of a product that does not comprise the deficiencies according to the state of the art.

The problem is solved with a method to determine the temperature of a product, comprising the following steps:
a. determine the dielectric constant as a function of the core-, surface-, and/or average-temperature correlation $\varepsilon(T)$ of at least one product and store in a computer means,
b. locate a product whose temperature shall be determined between a microwave-radiometry-antenna and a microwave-radiometry-receiver and measure the dielectric properties of this product,
c. select the dielectric constant correlation $\varepsilon(T)$ that corresponds to the product whose dielectric properties have been measured and
d. calculate the core-, surface-, and/or average-temperature using the dielectric constant correlation $\varepsilon(T)$ The present invention relates to a method to determine the temperature of a product based on its dielectrical properties. This is carried out by subjecting the product to an electromagnetic field provided by a microwave-radiometry-antenna and measuring the dielectric properties, by means of a signal received by a microwave-radiometry-receiver, as for example described in "Free-Space Measurement of Complex Permittivity and Complex Permeability of Magnetic Materials at Microwave Frequencies", D. K. GHODGANKAR et al, IEE TRANSACTIONS ON INSTRUMENTATION AND MEASUREMENT; VOL. 39, NO 2, APRIL 1990, Page 387 ff.

According to the present invention, first of all a correlation between the dielectric constant c as a function of the core-, surface-, and/or average-temperature T has to be determined, preferably measured. The data is acquired by placing a certain product with a known composition and preferably a known thickness in an electromagnetic field and measuring the dielectric constant c of this product. Preferably, a multitude of such measurements are taken, wherein the product and its thickness are maintained constant and the temperature of the product is changed. This data is used to determine a correlation of the dielectric constant correlation c versus core-, surface-, and/or average-temperature T. This correlation is particularly relevant for the desired core-, surface-, and/or average-temperature that the product should initially have and/or the core-, surface-, and/or average-temperature that the product is supposed to reach. In case the product is heated to a certain temperature or core-, surface-, and/or average-temperature range, the correlation must exist at least for this temperature and/or this range, preferably a larger range around the desired core-, surface-, and/or average-temperature. Preferably, the dielectric constant c is measured at different core-, surface-, and/or average-temperatures, preferably, at predetermined core-, surface-, and/or average-temperature intervals. Each of the measured values is preferably stored, preferably in a table or combined in a curve. The measurement must be taken and preferably stored for each and every product whose core-, surface-, and/or average-temperature shall be determined later on, individually. After the needed measurements have been acquired, preferably, a mathematical correlation is determined. Each product has its own correlation.

The core temperature is the temperature approximately in the middle of the product, preferably approximately at 50% of its height and/or length. The average temperature is preferably an average of the temperature distribution over the height/length of the product or the volume of the product. The height of the product is the extension of the product between the bottom of the product and the top of the product. The length of the product is preferably its largest extension in a horizontal plane.

Also, according to the present invention, a product, whose temperature shall be determined, for example during production, particularly before the product is treated, for example heated and/or after the treatment of the product, for example during and/or after its heating, is placed between a microwave-radiometry-antenna and a microwave-radiometry-receiver and the dielectric properties of this product is measured. Additionally, the thickness of the product can be measured.

In a next step, the dielectric constant correlation $\varepsilon(T)$ that corresponds to the product whose dielectric properties have been measured is selected and based on this information, the temperature of the product by using the dielectric constant correlation $\varepsilon(T)$ and preferably the thickness of the product is calculated.

The information about the dielectric properties $\varepsilon(T)$ are acquired upfront and preferably stored in a computer means. With the data an individual mathematical correlation can be calculated and/or experimentally determined, which describes the function and/or curve of the dielectric properties versus temperature. Hence, after a dielectric properties of a product has been measured, the corresponding temperature of a certain product can be determined, e.g. calculated.

The product whose core-, surface-, and/or average-temperature is going to be determined is preferably a food product for human or animal consumption. More preferably, the product is a protein containing product, specifically meat, fish and/or insects or it is a vegetarian product, for example a vegetable. The product may comprise a bone or a fish-bone.

Preferably, the temperature of the product is averaged over its volume.

The inventive method is preferably utilized in an apparatus which transfers heat to a, preferably protein containing, product. A protein containing product is especially meat, for example from swine, cow, chicken, lamb as well as fish or dairy-products. However, the product can also be, for example, any other food, like vegetables, fruit or the like. The meat may comprise bones or fish-bones. The meat is preferably processed, for example minced, marinated, spiced and/or battered. This heat treatment device can be for example an oven, a fryer or a thawing-apparatus. Preferably, this heat treatment device is an oven that heats products by radiation, natural- and/or forced convection. Vapor can be added to the heat treatment device if needed to adjust the relative humidity in the heat treatment device and/or to influence the heat transfer. This heat treatment device can be operated continuously or batch-wise, whereas a continuous operation is preferred. Preferably, the heat treatment device comprises several chambers in which different heat-treatment-conditions and/or environments are maintained. The heat treatment device comprises preferably means to control different parameters such as the temperature, the relative humidity and/or the heat transfer conditions in the heat treatment device. In a preferred embodiment vacuum is applied to the heat treatment device, particularly in case the heat treatment device is a thawing-apparatus.

According to the present invention, the heat treatment device preferably comprises transportation means, for example a belt, especially an endless belt, which transports products to be heated through and/or away from the heat treatment device. The path of the transportation means can be straight and/or curved, for example arranged at least partially in a helical path. The transportation means preferably has a width, i.e. the extension perpendicular to the transport direction, which is large enough to place several products side by side in one row, which are then transported in parallel rows through the heat treatment device. The rows extend perpendicular to the transport direction. The product can, however, also be placed at random on the belt, for example in case of manual loading. The transportation means can, at least partially, be made from a material that absorbs that is at least essentially translucent or transparent for electromagnetic radiation, particularly radio frequencies (RF).

The heat treatment device preferably comprises at least one device to measure the dielectric properties of the individual product and transmits the signal to a device which converts the measured signal into a temperature of the product on the transportation means. Preferably, the transportation means is provided between the microwave-radiometry-antenna and the microwave-radiometry-receiver of the dielectric properties measurement means. Alternatively or additionally, the antenna/receiver are located next to a freefall, wherein the products fall in a corridor between the microwave-radiometry-antenna and the microwave-radiometry-receiver.

The antenna and the receiver are preferably stationary. The antenna/receiver are preferably located near the exit of the heat treatment device and/or outside, downstream of the heat treatment device. Both locations allow to determine the temperature to which the product has been heated. This temperature-reading allows, for example, to control the heating process. Additionally or alternatively, the antenna is preferably located near the entrance of the heat treatment device and/or outside upstream of the heat treatment device. Both locations allow to determine the initial core temperature prior to heating the product. This temperature also allows, for example to control the heating process. The person skilled in the art understands that preferably the initial temperature and the final temperature after the heat treatment are used to control the treatment process.

In case the transportation means are located between the antenna and the receiver, the influence of the transportation means on the measurement of the temperature of the product is preferably eliminated for example by means of calibration.

According to a preferred embodiment of the present invention, the heat treatment device comprises means to influence the heat treatment process to heat the product. Such means can be, for example, means to alter the temperature, means to influence the heat transfer, means to provide radiation, residence time of the product in the heating device and/or means to alter the relative humidity of the environment around the products. These means can be used to provide uniform heat treatment conditions over the entire widths of the transportation means, i.e. to all products in one row or to provide non uniform heat treatment conditions to all products in one row in case, the number of products per unit area on the transportation means differs as a function of the width of the transportation means. In this case, it can be desirable, to provide more heating energy and/or more efficient heat transfer in the area with more products per unit area than in the area with less products per unit area. These means to influence the heat treatment process are, in a preferred embodiment of the present invention, controlled according to the signal of the antenna, which is converted into a temperature reading. This antenna is for example placed at or near the entrance and/or the exit of the heat treatment device, for example the oven, and measures the initial and/or final temperature of the individual product. Based on this measurement, the heat treatment process is altered, to achieve an optimal temperature.

In another preferred embodiment, the device comprises means to track the position of the individual product. This means can be for example an XY tracking system and is for example useful to know where an individual product is at a certain instant of time. This information can be for example used to sort out products for example by a Pick and Place Robot, which do not meet certain quality criteria especially which do not meet a certain temperature; i.e. if the temperature is either too high or too low, these products are sorted out for example by the Pick and Place Robot. This robot needs the XY coordinates of this product to be sorted out, in order to pick the right product from the transportation means.

In another preferred embodiment, the temperature information acquired by the antenna is stored in storing means. This information can be for example used as a quality control function to document how the individual product has been heat-treated in the heat treatment process. According to another preferred embodiment, this information is transferred to storing means, for example a transponder, which is attached to a packaging or the like in which the product is placed and packed. In case of a quality problem, the information can be directly read out of this transponder and is available to the merchandiser or the customer.

According to a preferred embodiment or another embodiment of the present invention, the heat treatment device comprises product detection means, which are located upstream of the heat treatment device. These means can be used to at least partially turn the heat treatment device on and off. In case, that no products are on the transportation means, the heat treatment device is at least partially turned off. However, as soon as these detections means identify a product, the heat treatment device is turned on again well before the product arrives at the heat treatment device. With this preferred or inventive embodiment of the present invention, energy of the heat treatment process can be saved.

Preferably, the antenna and the accompanying electronics detects and analyzes microwaves in a frequency band between 0.01-90 GHz, whereas low frequencies around a frequency band between 1-20 GHz are more preferred. In an even more preferred embodiment, the frequencies received and analyzed by the antenna and the accompanying electronics is altered during one measurement, whereas low frequencies provide information about the temperature deep inside the product and higher frequencies information about the temperature of product nearer to the surface.

BRIEF DESCRIPTION OF THE DRAWINGS

The inventions are now explained according to FIGS. 1-4. These explanations do not limit the scope of protection.

DETAILED DESCRIPTION

Figure 1:
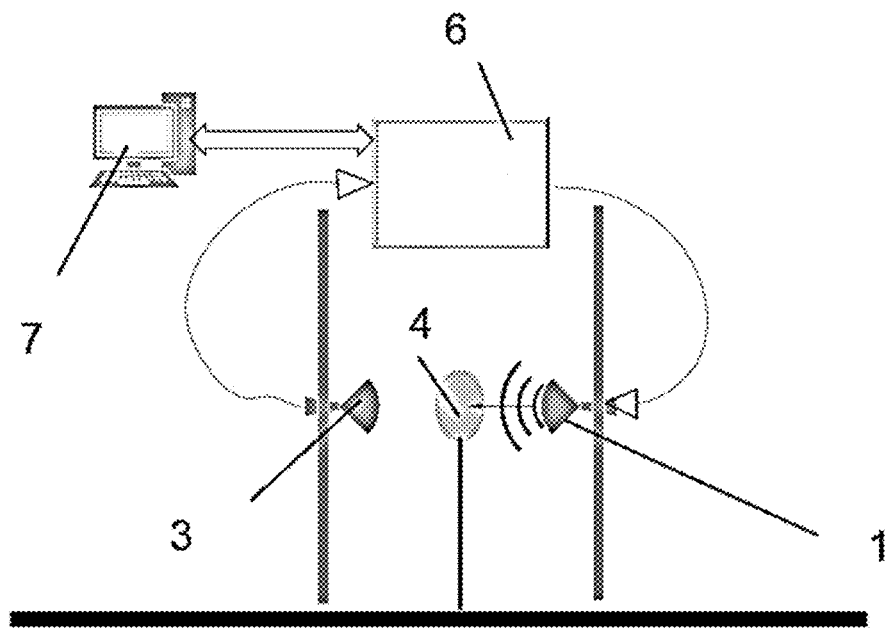
FIG. 1 shows the set up to measure dielectric properties.

FIG. 1 shows the set-up of the measurement of the dielectric properties $\varepsilon_r$ of a product 4. In the present case, the product 4 is placed between a microwave-radiometry-antenna 1 and a microwave-radiometry-receiver 3. The antenna 1 emits an electromagnetic field and the receiver 3 receives electromagnetic radiation. The receiver 3 and the antenna 1 are both connected to a microwave vector network analyzer 6 which, based on both signals and an appropriate hard- and/or software allows the determination of the dielectric properties of the product 4. The acquired data is preferably stored in computer means 7. For the determination of the dielectric properties as a function of its core-, surface-, and/or average-temperature, a certain product, whose composition and thickness is known, is placed between the antenna and the receiver and after the dielectric properties have been measured, the core-, surface-, and/or average-temperature of the product is changed and the next dielectric property for this core-, surface-, and/or average-temperature is acquired and preferably stored in the computer means 7. This procedure for different core-, surface-, and/or average-temperatures is repeated until sufficient data for correlation of the dielectric properties has been acquired. The procedure can be repeated for different products.

Figure 2:
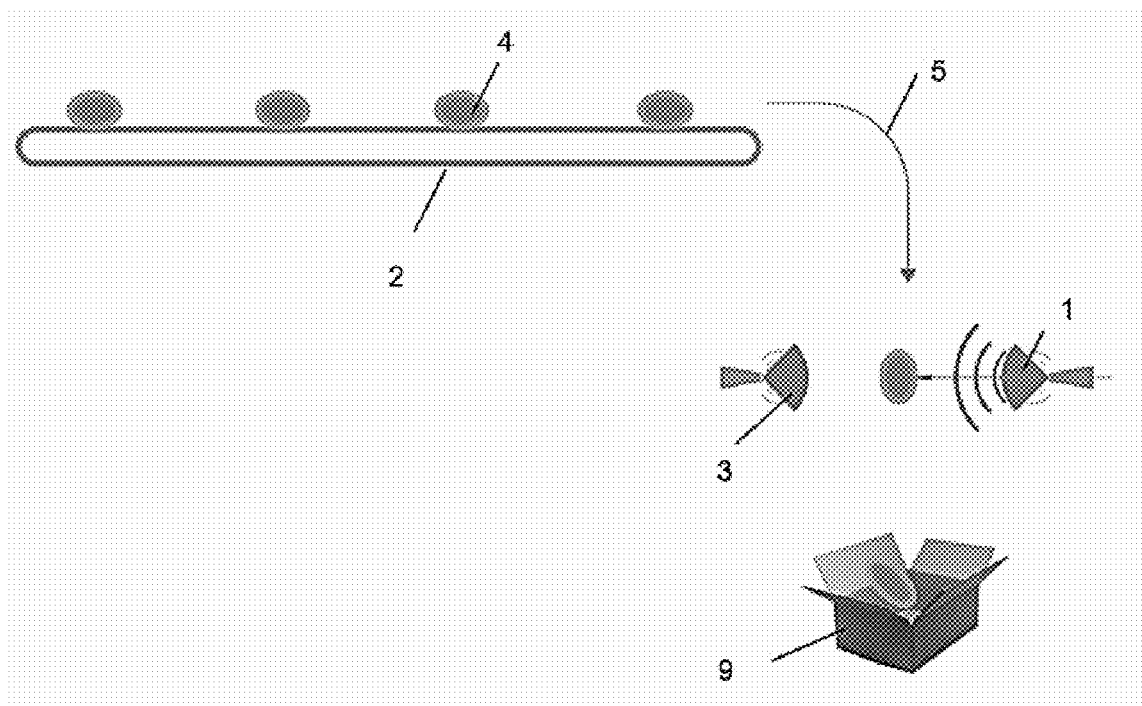
FIGS. 2, 3, and 4 show set ups to measure temperatures during production.

FIG. 2 shows a first production set up. Products 4, for example patties of minced pork meat with a certain thickness have been heated in an oven to a desired core-, surface-, and/or average-temperature range. The products are transported by a conveyor, here an endless belt, and at the end of the belt the products drop along a freefall 5 into a container 9. During the freefall, the products pass the antenna 1 and the receiver 3, as described according to FIG. 1 and the dielectric properties of each product is measured and based on this measurement, its temperature is determined to assure that each product has been heated sufficiently.

Figure 3:
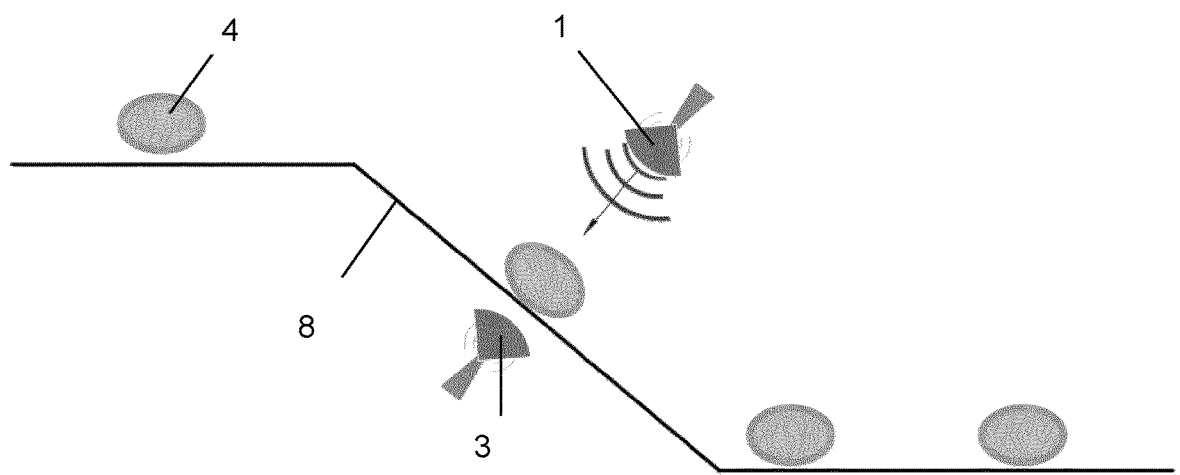

Regarding the embodiment according to FIG. 3, reference can be made to disclosure according to FIGS. 1 and 2. Here the measurement is done during a slide of the products along a ramp 8. Here, the ramp 8 is provided between the antenna 1 and the receiver 3. The influence of the ramp 8 on the measurement of the dielectric properties of the product 4 can be eliminated, for example by means of calibration.

Figure 4:
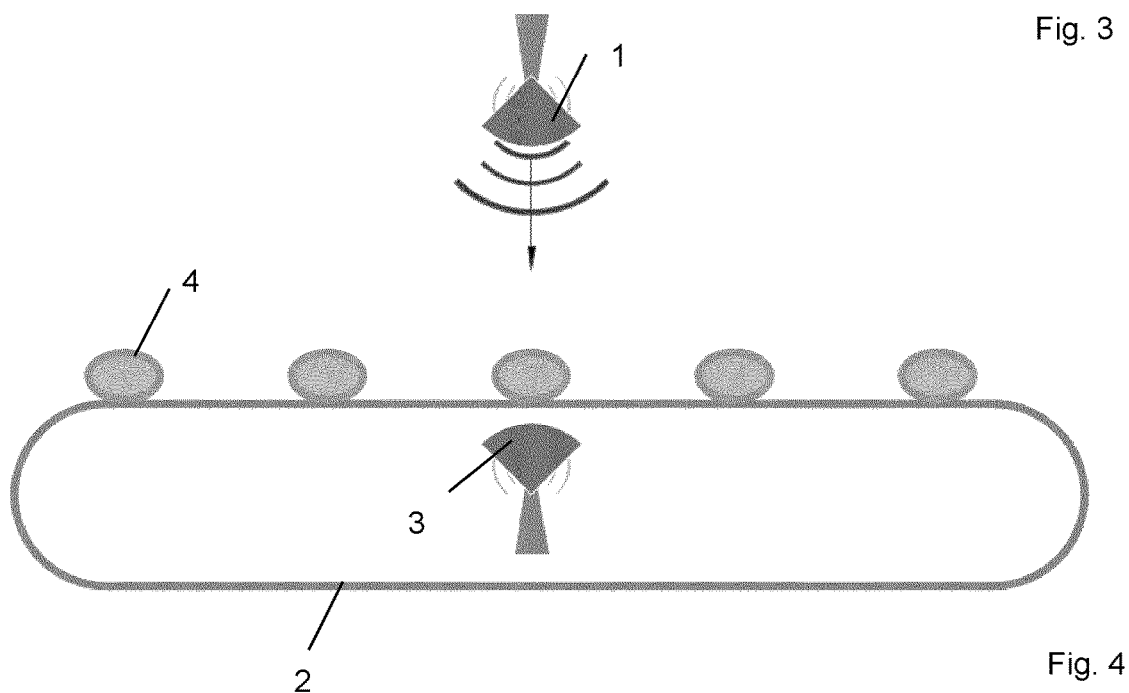

Regarding the embodiment according to FIG. 4, reference can be made to disclosure according to FIGS. 1 and 2. Here the measurement is done during transportation of the products with an endless belt 2. Here, the belt 2 is provided between the antenna 1 and the receiver 3. The influence of the belt on the measurement of the dielectric properties of the product 4 can be eliminated, for example by means of calibration.

Regarding the embodiments of all FIGS. 1-4, the skilled person understands, that the position of the antenna 1 and the receiver 3 can be exchanged.

Figure 5:
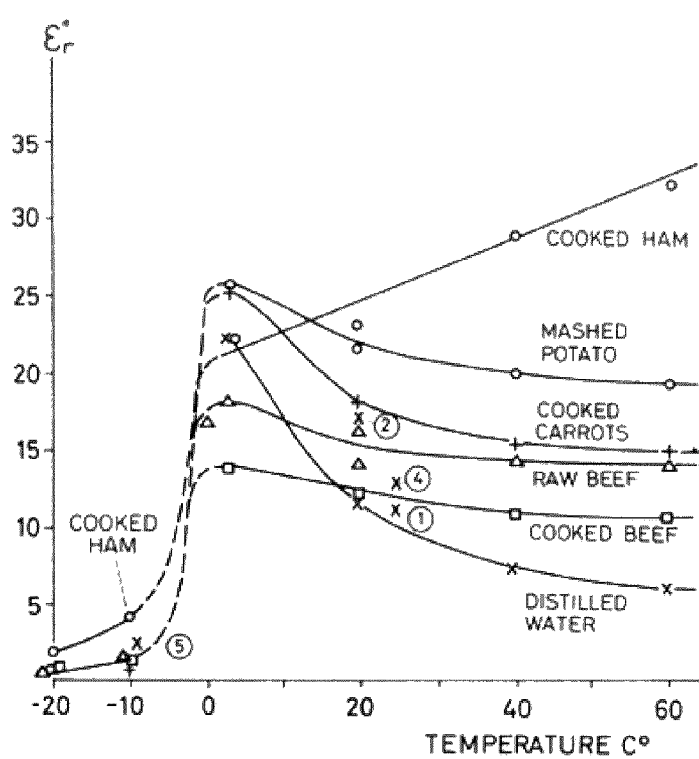
FIG. 5 shows examples of stored data in the form of curves.

FIG. 5 depicts the dependency of the dielectric properties $\varepsilon_r$ from the temperature for various products such as distilled water, cooked beef, raw beef etc. The respective curves are measured or calculated for the individual products and stored. After having received a value for the dielectric properties $\varepsilon_r$ and knowing the type of product that has been measured, its temperature can be derived. The curves show that even though all products mainly consist of water, the density, the composition and the structure of the product has a significant influence on the determined temperature at the same dielectric properties $\varepsilon_r$ values, particularly at higher temperatures.

LIST OF REFERENCE SIGNS 1 microwave-radiometry-antenna
2 Transportation means, belt
3 microwave-radiometry-receiver
4 Product
5 Freefall
6 Microwave vector network analyzer
7 Computer means
8 Ramp
9 Container

The invention claimed is:

1. A method to determine a temperature of a product, comprising steps of:
   determining a correlation ($\varepsilon$(T)) between a dielectric constant of the product as a function of a core-, surface-, and/or average-temperature of the product and storing the determined correlation ($\varepsilon$(T)) in a computer means;
   heating the product in an oven;
   transporting the product by a conveyor from the oven towards a container;
   dropping the product from the conveyor into the container located below the conveyor along a free fall path;
   during the free fall path and before the product falls into the container, locating the product between a microwave-radiometry-antenna and a microwave-radiometry-receiver and measuring the dielectric constant of the product, the microwave-radiometry-antenna and the microwave-radiometry-receiver being located below the conveyor and above the container;

selecting the determined correlation ε(T) from the computer means that corresponds to the product whose dielectric constant has been measured; and calculating the core-, surface-, and/or average-temperature of the product using the selected determined correlation ε(T).

2. The method according to claim 1, wherein the method comprises measuring a thickness of the product.

3. The method according to claim 1, wherein the core-, surface-, and/or average-temperature of the product is calculated using the selected determined correlation (ε(T)) and a thickness of the product.

4. The method according to claim 1, wherein an influence of the conveyor is eliminated via calibration.

5. The method according to claim 1, wherein the core-, surface-, and/or average-temperature of the product and/or moisture of a heating medium in the oven and/or heat transfer characteristics is controlled.

6. The method according to claim 1, wherein the core-, surface-, and/or average-temperature of the product is used as an initial and/or final temperature control of the oven.

\* \* \* \* \*